US010397382B2

(12) United States Patent
Zeng

(10) Patent No.: US 10,397,382 B2
(45) Date of Patent: *Aug. 27, 2019

(54) ELECTRONIC DEVICE WITH SCREEN PROTECTOR

(71) Applicant: GUANGDONG OPPO MOBILE TELECOMMUNICATIONS CORP., LTD., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,452

(22) Filed: Dec. 28, 2018

(65) Prior Publication Data

US 2019/0166235 A1 May 30, 2019

Related U.S. Application Data

(63) Continuation of application No. 15/988,976, filed on May 24, 2018.

(30) Foreign Application Priority Data

Nov. 27, 2017 (CN) .......................... 2017 1 1204841
Nov. 27, 2017 (CN) ..................... 2017 2 1611250 U

(51) Int. Cl.
H04M 1/02 (2006.01)
H04B 1/3888 (2015.01)

(52) U.S. Cl.
CPC .......... *H04M 1/026* (2013.01); *H04B 1/3888* (2013.01)

(58) Field of Classification Search
CPC ........ H04M 1/72577; H04M 1/72566; H04W 4/50
See application file for complete search history.

(56) References Cited

U.S. PATENT DOCUMENTS 7,059,182 B1 6/2006 Dean et al.
9,571,150 B2 * 2/2017 Sanford ............... H04B 1/3888
9,715,257 B2 7/2017 Manullang et al.
(Continued)

FOREIGN PATENT DOCUMENTS

CN 105847471 A 8/2016
CN 105847494 A 8/2016
(Continued)

*Primary Examiner* — Marisol Figueroa
(74) *Attorney, Agent, or Firm* — Ladas & Parry LLP

(57) ABSTRACT

An electronic device may include a shell defining a plurality of positioning slots, a screen mounted in the shell, a screen protector connected to the shell and arranged at a periphery of the screen. The screen protector may be presented as a frame being made in one piece, a plurality of positioning pins may be arranged on the screen protector, each of the plurality of positioning pins may have an extending direction perpendicular to the screen and be engaged in a corresponding positioning slot. The screen protector may be configured to stretch or retract relative to the screen along a direction perpendicular to the screen under the guide of the plurality of positioning pins, such that the screen protector moves between a stretchable state and a retractable state.

19 Claims, 18 Drawing Sheets

(56) References Cited

U.S. PATENT DOCUMENTS

| | | | |
|---|---|---|---|
| 2011/0194230 | A1 | 8/2011 | Hart et al. |
| 2014/0274232 | A1 | 9/2014 | Tages |
| 2015/0301565 | A1 | 10/2015 | Tyson et al. |
| 2015/0341712 | A1 | 11/2015 | Wilcox et al. |

FOREIGN PATENT DOCUMENTS

| | | |
|---|---|---|
| CN | 106060212 A | 10/2016 |
| CN | 107343073 A | 11/2017 |
| CN | 107819909 A | 3/2018 |

\* cited by examiner

XVII- XVII

B

ELECTRONIC DEVICE WITH SCREEN PROTECTOR

CROSS REFERENCE TO RELATED APPLICATIONS

This is a continuation application of co-pending U.S. patent application Ser. No. 15/988,976, filed on May 24, 2018, the contents of which are herein incorporated by reference in their entireties.

TECHNICAL FIELD

The described embodiments relate to electronic devices and in particular to an electronic device with a screen protector.

BACKGROUND

Electronic devices, such as mobile phones, tablet PCs, intelligent wearable equipment, are widely used in our daily life. Physical hazards including dropping, shock, compression and impact may lead to potential loss or damage to the electronic device easily. Especially, exposing, of a screen of the electronic device, to the external environment may increase the risk of damage due to accident.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
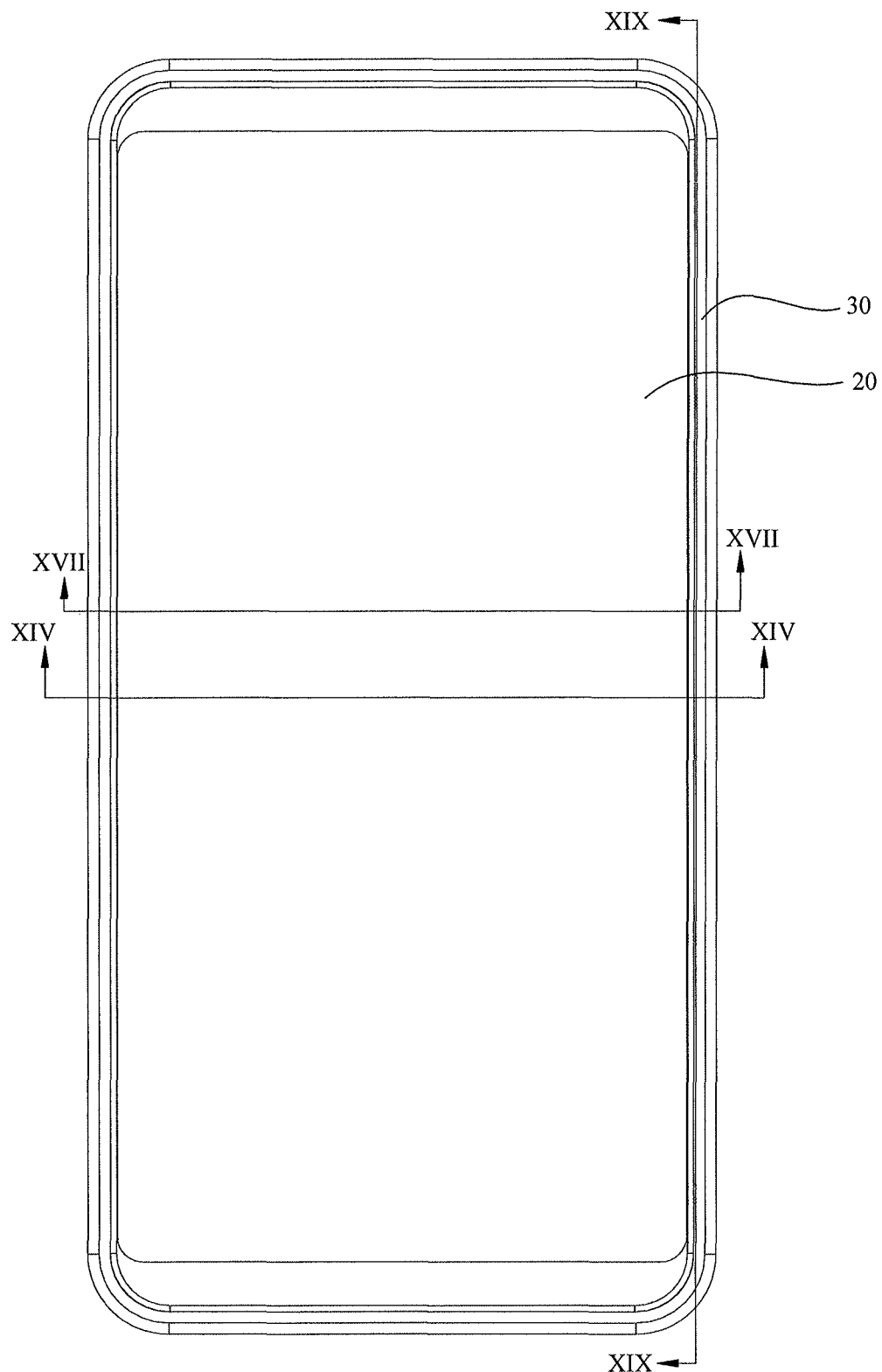
FIG. 1 is a schematic view of an exemplary electronic device according to one embodiment of the present disclosure.

Below embodiments of the disclosure will be described in detail, examples of which are shown in the accompanying drawings, in which the same or similar reference numerals have been used throughout to denote the same or similar elements or elements serving the same or similar functions. The embodiments described below with reference to the accompanying drawings are exemplary only, meaning they are intended to be illustrative of rather than limiting the disclosure.

In the specification of the present disclosure, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", and "circumference" refer to the orientations and locational relations illustrated in the drawings, and for describing the present disclosure and for describing in a simple manner, and which are not intended to indicate or imply that the device or the elements are disposed to locate at the specific directions or are structured and performed in the specific directions, which could not to be understood as limiting the present disclosure.

In addition, terms such as "first" and "second" are used herein for purposes of description and are not intended to indicate or imply relative importance or significance or to imply the number of indicated technical features. Thus, the feature defined with "first" and "second" may include one or more of such a feature. In the description of the present disclosure, "a plurality of" means two or more than two, unless specified otherwise. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

In the present disclosure, unless specified or limited otherwise, terms "mounted", "connected", "coupled", "fixed", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the following, an electronic device provided in embodiments of the present disclosure will be described with reference to drawings.

The electronic device may include mobile phones, tablet PCs, intelligent wearable equipments, etc. It should be understood that "electronic device" in this disclosure can include, but not limited to, an apparatus receiving/transmitting communication signals via wired connection, for example, public switched telephone network (PSTN), digital subscriber line (DSL), digital cable, electric cable and/or another data connection/network, and/or cellular network, Wireless Area Networks (WLAN), digital television network such as DVB-H (Digital Video Broadcasting Handheld) network, satellite network, AM-FM broadcast transmitter and/or another communication terminal of wireless interface. The electronic device may include a satellite or cellular telephone, a personal communication system terminal with cellular radio telephone and data processing, facsimile and data communication, beeper, or other electronic apparatuses with a transceiver.

Figure 2:
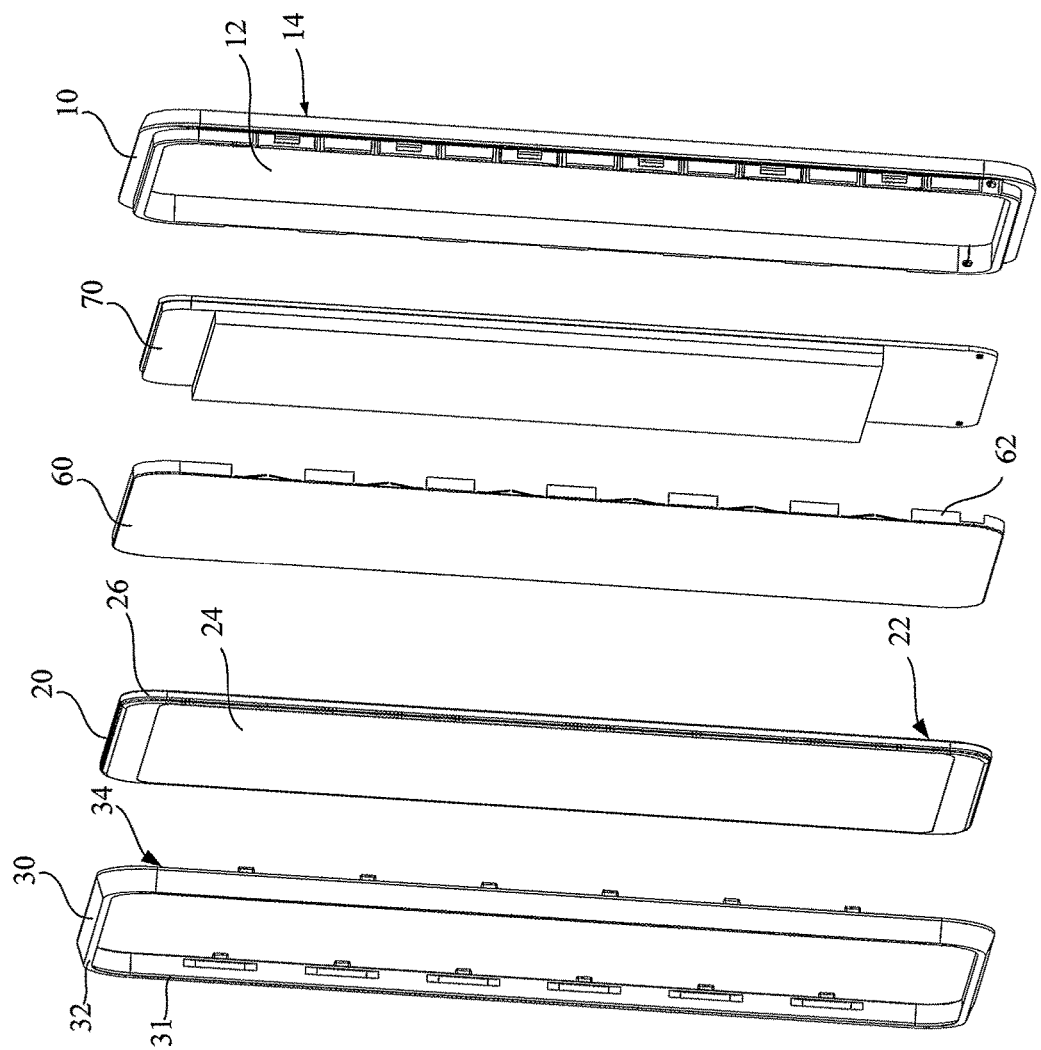
FIG. 2 is an exploded view of the electronic device of FIG. 1.

Please referring to FIGS. 1-2, the electronic device, according to an exemplary embodiment, may include a housing 10, a screen 20 received in the housing 10 and a screen protector 30 connected to the housing 10 and arranged at a circumference of the screen 20.

The housing 10, which may sometimes be referred to as a case or a shell, may be formed of plastic, glass, ceramics, fiber composites, metal (e.g., stainless steel, aluminum, etc.), other suitable materials, or a combination of these materials. In some situations, parts of housing 10 may be formed from dielectric or other low-conductivity material. In other situations, the housing 10 or at least some of the structures that make up the housing 10 may be formed from metal elements.

In one embodiment, the housing 10 may have a rectangular configuration. Alternatively, the housing 10 may have other configurations, such as round, long round and ellipse etc. The housing 10 may define a chamber 12 to receive the screen 20. In one embodiment, a sealing element 60, a main board 70 and other components such as a battery, a camera assembly etc. may also be received in the chamber 12. In particularly, the sealing element 60, the main board 70 and other components may be arranged between the screen 20 and the housing 10. The housing 10 may include a bottom surface 14 opposite to the chamber 12. Patterns, such as a logo, may be provided on the bottom surface 14 of the housing 10, which can improve identification and appearance of the electronic device. In some embodiments, an antenna slot (not shown) may be defined in the housing 10, and it may be communicated with an antenna component inside the shell assembly 10.

The screen 20, according to an exemplary embodiment, may be configured to display images and include pixels formed from light-emitting diodes (LEDs), organic LEDs (OLEDs), plasma cells, electrowetting pixels, electrophoretic pixels, liquid crystal display (LCD) components, or other suitable pixel structures. A screen cover layer such as a layer of clear glass or plastic may cover the surface of the screen 20 or the outermost layer of the screen 20 may be formed from a color filter layer, thin-film transistor layer, or other display layer. In this embodiment, the screen 20 may further incorporate touch electrodes and be used as a touch screen for inputting information.

The screen 20 of this embodiment may have a rectangular configuration. Alternatively, the screen 20 may have other configurations in other embodiments. Furthermore, the screen 20 may be flat and include a bottom surface 22 near the bottom surface 14 of the housing 10, a top surface 24 far away from the bottom surface 14 of the housing 10 and an outer side surface 26 connecting between the bottom surface 22 and the top surface 24. The screen 20 may include display area and non-display area.

Figure 3:
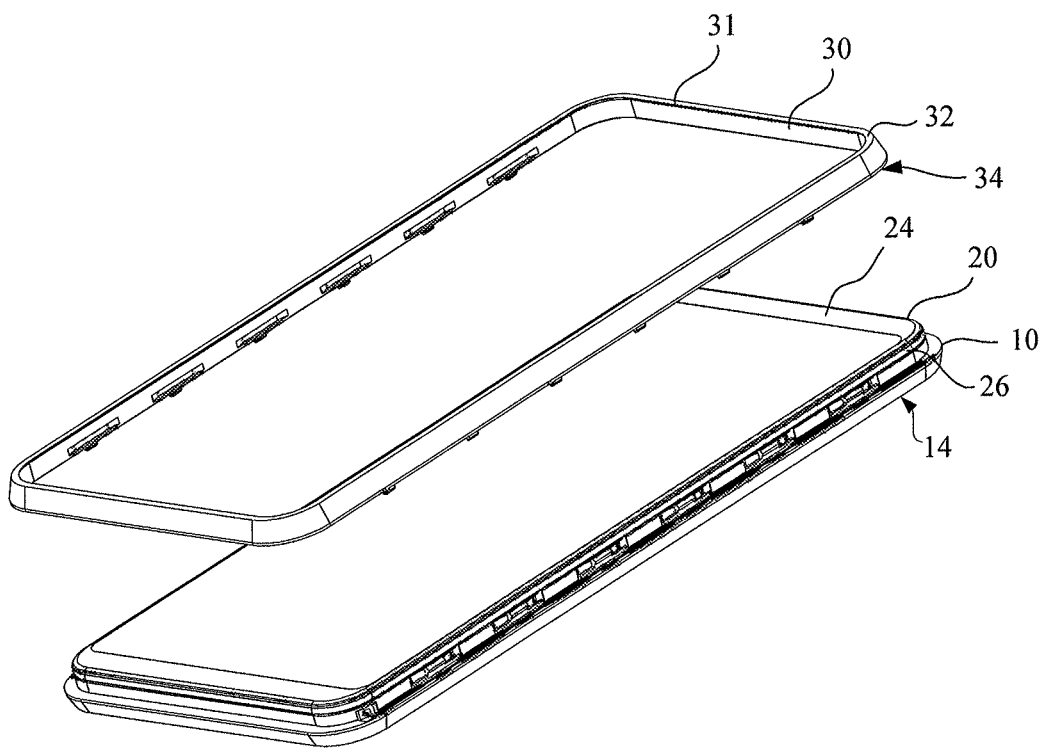
FIG. 3 is a partly exploded view of the electronic device of FIG. 1, wherein a screen is mounted in a housing of FIG. 1.

The screen protector 30, according to an exemplary embodiment, may be made of plastic or metal such as stainless steel, aluminum, or other suitable materials and is configured to absorb the impact energy that may lead to damage. Referring to FIG. 3, the screen protector 30 may be presented as a frame being made in one piece and including an inner surface 31. The screen protector 30 may have a similar configuration as the screen 20. In one embodiment, the screen protector 30 may be arranged at the same side of the housing 10 as the screen 20 and at a periphery of the screen 20 and surround the screen 20. The periphery of the screen 20 may be an area outside of the screen 20 and surrounding the screen 20. The inner surface 31 of the screen protector 30 may contact with the outer side surface 26 of the screen 20. The screen protector 30 may have a rectangular configuration and include four side walls connected with each other end to end, which make the manufacturing of the screen protector 30 more convenience, thereby reducing cost of production. Alternatively, the screen protector 30 may include one or two of the four side walls attached to the screen 20 at its side(s). In other embodiments, the screen protector 30 may have long round, round or other configurations, which is not limited herein. The screen protector 30 may include a top surface 32 and a bottom surface 34 opposite to the top surface 32 along a direction substantially perpendicular to the screen 20. The top surface 32 of the screen protector 30 may be farther from the bottom surface 14 of the housing 10 than the bottom surface 34 of the screen protector 30.

Figure 4:
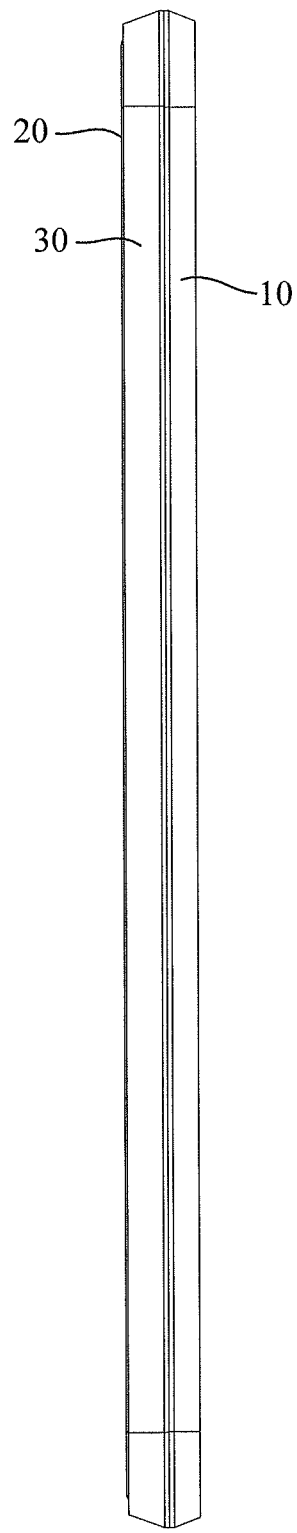
FIG. 4 is a right view of the electronic device in FIG. 1 in a non-falling state.
Figure 5:
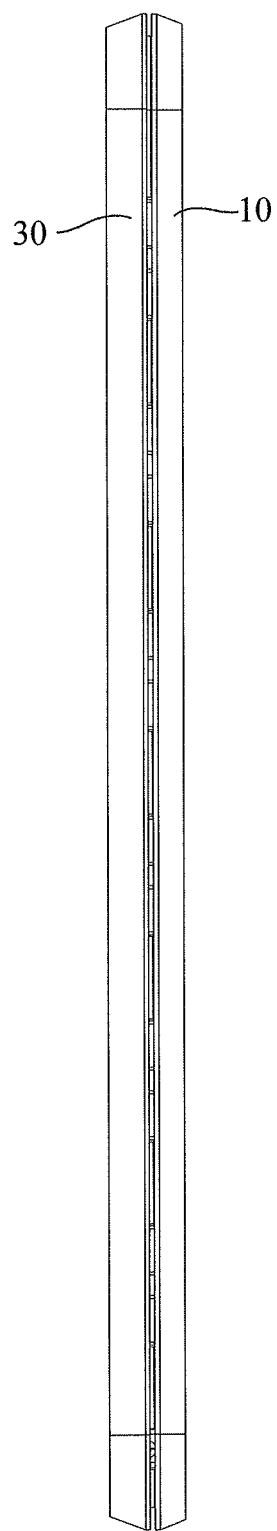
FIG. 5 is a right view of the electronic device in FIG. 1 in a falling state.

The screen protector 30 may be capable of stretching or retracting relative to the screen 20 such that the screen protector 30 could be moveable between a stretchable state and a retractable state. In this embodiment, the screen protector 30 may protect the screen 20 in a manner of switching from the retractable state to the stretchable state. Specifically, referring to FIG. 4, when the screen 20 is in a normal state, such as a non-falling state, the screen protector 30 may be in the retractable state. Referring to FIG. 5, when the screen 20 is in an abnormal state, such as getting close toward an object at a speed greater than a preset value, such as, a floor, a chair etc., the screen protector 30 may be configured to stretch relative to the screen 20 and be in the stretchable state such that the screen protector 30 touches the object to prevent the screen 20 from touching the object. The preset value may be about a speed when the electronic device falls onto the floor. In this way, impact energy from the object is redirected from the screen 20 to the screen protector 30, so as to protect the screen 20 from being impacted by the object directly, thereby protecting the screen 20 effectively and reducing loss in economy. It should be noted that the abnormal state may be a state when the electronic device is getting close toward the object at a speed greater than the preset value, for example, the electronic device is falling down toward a floor, or being thrown toward a wall. The normal state may be a state when the electronic device is not getting close toward the object at a speed greater than the preset value, i.e. the electronic device is static or getting close toward the object at a speed less than the preset value, for example, the electronic device is hold in one's hand, or placed on a support. In this embodiment, a falling state may be taken as an example of the abnormal state, and a non-falling state may be taken as an example of the normal state.

Figure 6:
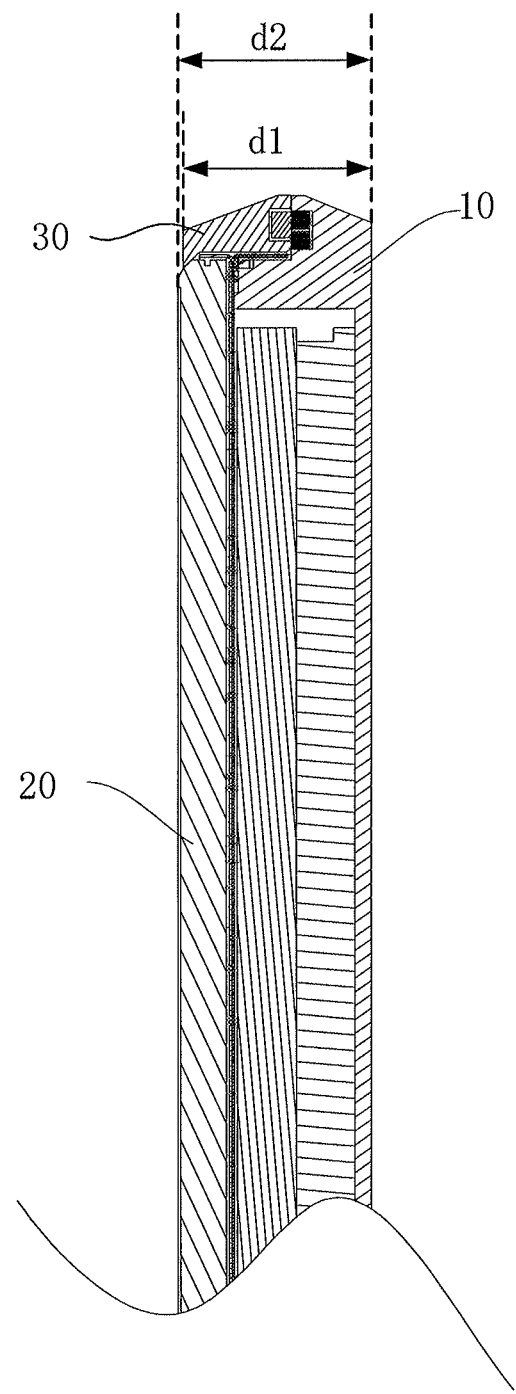
FIG. 6 is a partial cross-sectional view of the electronic device in FIG. 4.

More specifically, please referring to FIG. 6, when the electronic device is in the non-falling state, i.e. a normal state, the screen protector 30 may be below the screen 20, that is, the bottom surface 34 of screen protector 30 may contact with the housing 10, a first distance d1 from the top surface 24 of the screen protector 30 to the bottom surface 14 of the housing 10 may be less than a second distance d2 from the top surface 24 of the screen 20 to the bottom surface 14 of the housing 10, that is, d1<d2. A difference between d1 and d2 may be about 0.2 mm. In other embodiments, the screen protector 30 may be leveled with the screen 20 when the electronic device is in the non-falling state, that is d1=d2.

Figure 7:
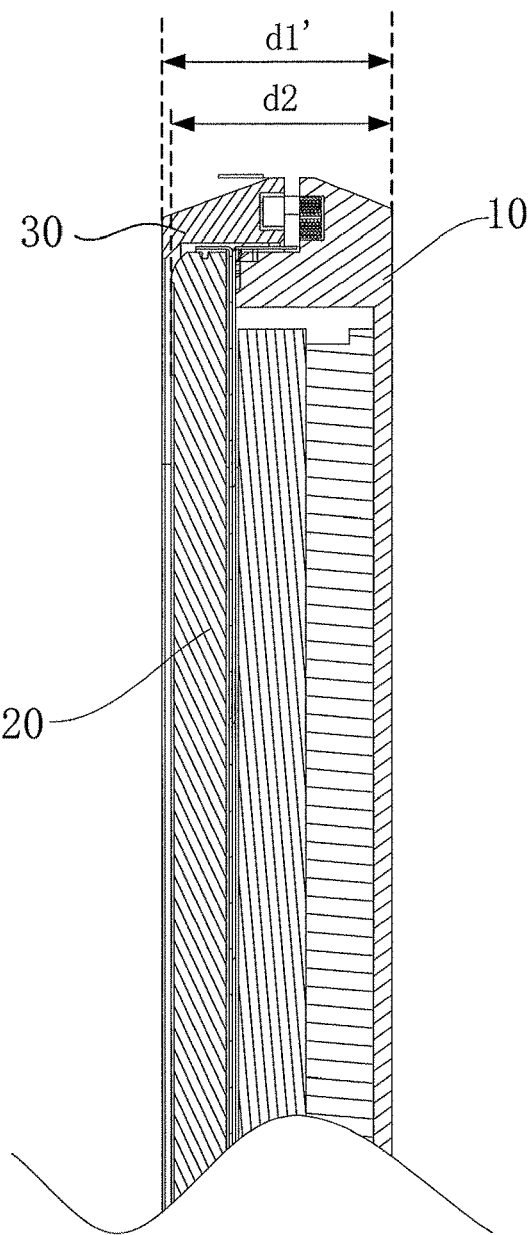
FIG. 7 is a partial cross-sectional view of the electronic device in FIG. 5.
Figure 8:
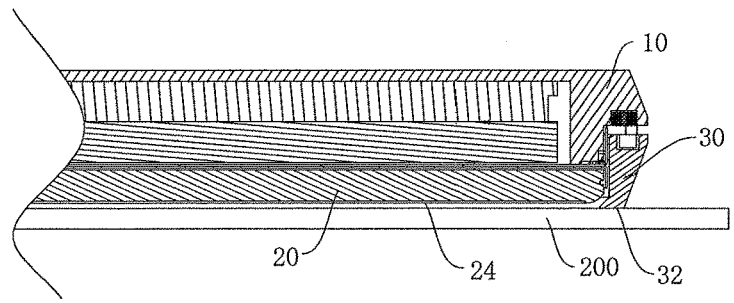
FIG. 8 is a partial cross-sectional view of the electronic device when the electronic device falls to the floor according to one embodiment of the present disclosure.

Referring to FIGS. 7 and 8, when the electronic device is in the falling state, i.e. a non-normal state, the screen protector 30 may be above the screen 20, that is, the bottom surface 34 of screen protector 30 may be detached from the housing 10 along a direction substantially perpendicular to the screen 20. The screen protector 30 may stretch relative to the screen 20 such that the screen protector 30 is in the stretchable state, at this time, the first distance from the top surface 24 of the screen protector 30 to the bottom surface 14 of the housing 10 makes a change from d1 to d1'. The second distance d2 from the top surface 24 of the screen 20 to the bottom surface 14 of the housing 10 keeps unchanged no matter the electronic device is in the falling state or non-falling state. The first distance d1' is greater than the second distance d2, that is, d1'>d2. In this embodiment, the screen protector 30 may stretch for about 0.5 mm, and the difference between the d1' and d2 may be about 0.3 mm. In this way, the top surface 32 of the screen protector 30 may touch the floor 200, while the top surface 24 of the screen 20 may not touch the floor 200, which could prevent the screen 20 from being impacted by the floor 200.

In this embodiment, the screen protector 30 is arranged at a circumference of the screen 20, which may make it convenience to assemble the screen protector 30 to the housing 10 on one hand, on the other hand, may make the protection for the screen 20 more general and reliable. Specifically, the screen protector 30 could stretch to protect the screen 20 reliably no matter what angle the electronic device is when it falls down.

It is understood that, since the screen protector 30 is arranged at the periphery of the screen 20, on one hand, the screen protector 30 may be exposed outside, that is, the screen protector 30 may not be overlapped by the screen 20, no matter in stretchable state or in retractable state, such that the screen protector 30 could be used as a middle frame of the electronic device. On the other hand, the screen protector 30 could be arranged on the housing 10 and independent from the screen 20. Therefore, there is no need for the screen 20 to provide a location for the screen protector 30, which could remain the integrity of the screen 20.

In another embodiment, the electronic device may include a plurality of screens 20, the plurality of screens 20 may be embedded in a same side of the housing 10 or in different sides of the housing 10. Correspondingly, the electronic device may include a plurality of screen protectors 30 arranged at the circumference of each of the screens 20 respectively. In some situations, when the plurality of screens 20 are received in the same side of the housing 10, one screen protector 30 surrounding all of the screens 20 may be enough to protect the screens 20.

Figure 9:
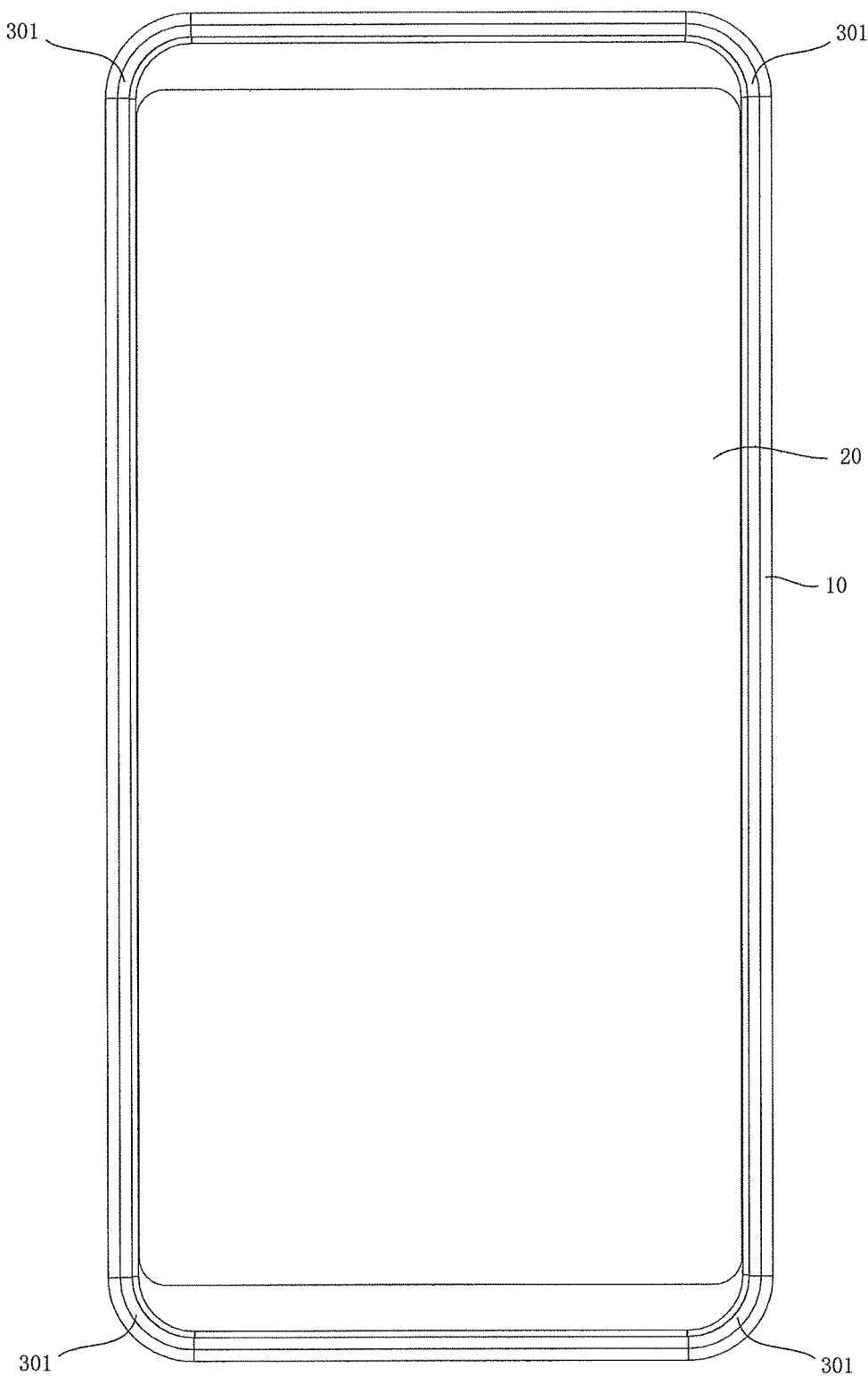
FIG. 9 is a schematic view of an exemplary electronic device according to another embodiment of the present disclosure.
Figure 10:
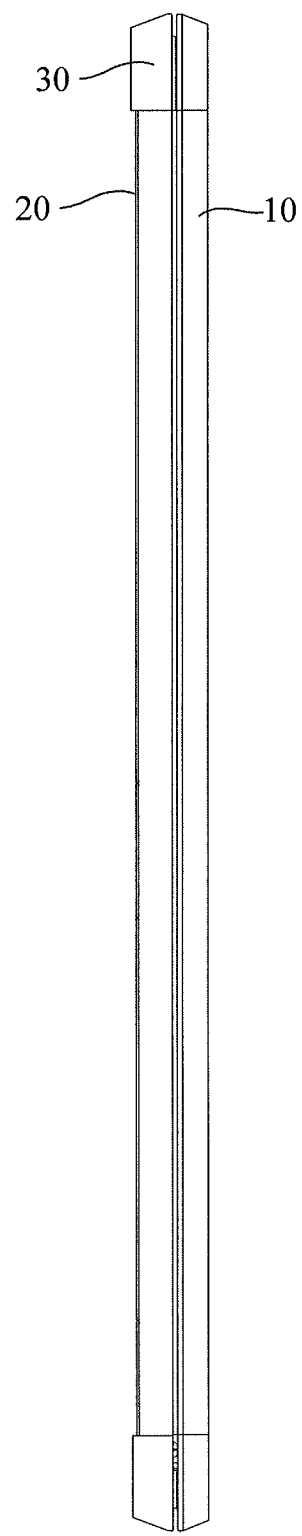
FIG. 10 is a right view of the exemplary electronic device in FIG. 9 in the falling state.

In another embodiment, referring to FIGS. 9 and 10, the screen protector 30 may include a plurality of sub-protectors 301, the plurality of sub-protectors 301 are arranged along a circumference of the screen 20 and spaced apart from each other. For example, the plurality of sub-protectors 301 may be arranged on the four corners of the housing 10. In still another embodiment, the plurality of sub-protectors 301 may be arranged on opposite edges of the housing 10.

In still another embodiment, the screen protector 30 may be an electrostatic protection tab. When the electronic device is in a falling state, the electrostatic protection tab may pop from the housing 10 to protect the screen 20.

In still another embodiment, when the screen protector 30 is in the stretchable state, the screen protector 30 could rotate along the circumference of the screen 20.

Figure 15:
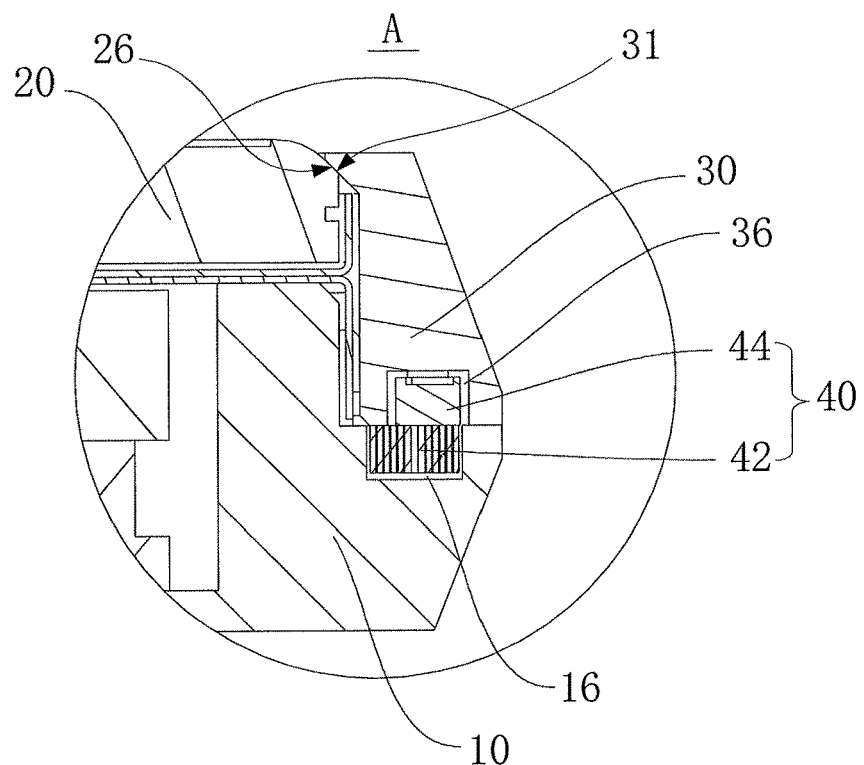
FIG. 15 is an enlarged view of circle A in FIG. 14.

Referring to FIG. 15, the electronic device, according to an exemplary embodiment, may further include a drive assembly 40 to drive the screen protector 30 to stretch or retract. There are many ways for the drive assembly 40 to drive the screen protector 30, such as, elastic force or magnetic force etc. In one embodiment, the drive assembly 40 may drive the screen protector 30 by magnetic force.

Figure 11:
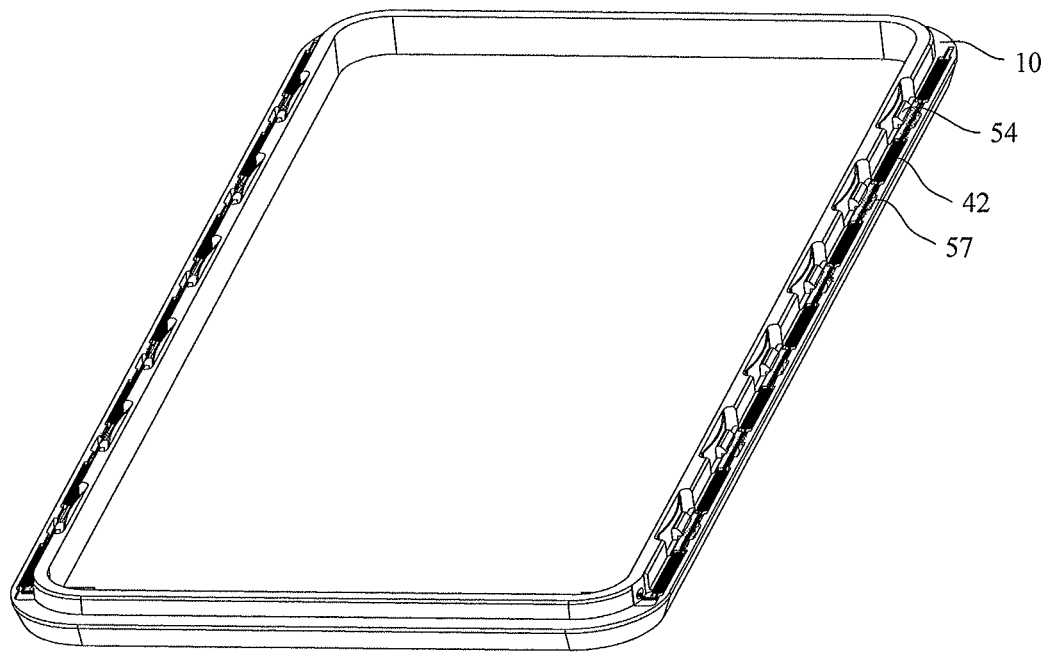
FIG. 11 is a perspective view of the housing of an exemplary electronic device assembled with a drive assembly and locking mechanisms according to one embodiment of the present disclosure.
Figure 13:
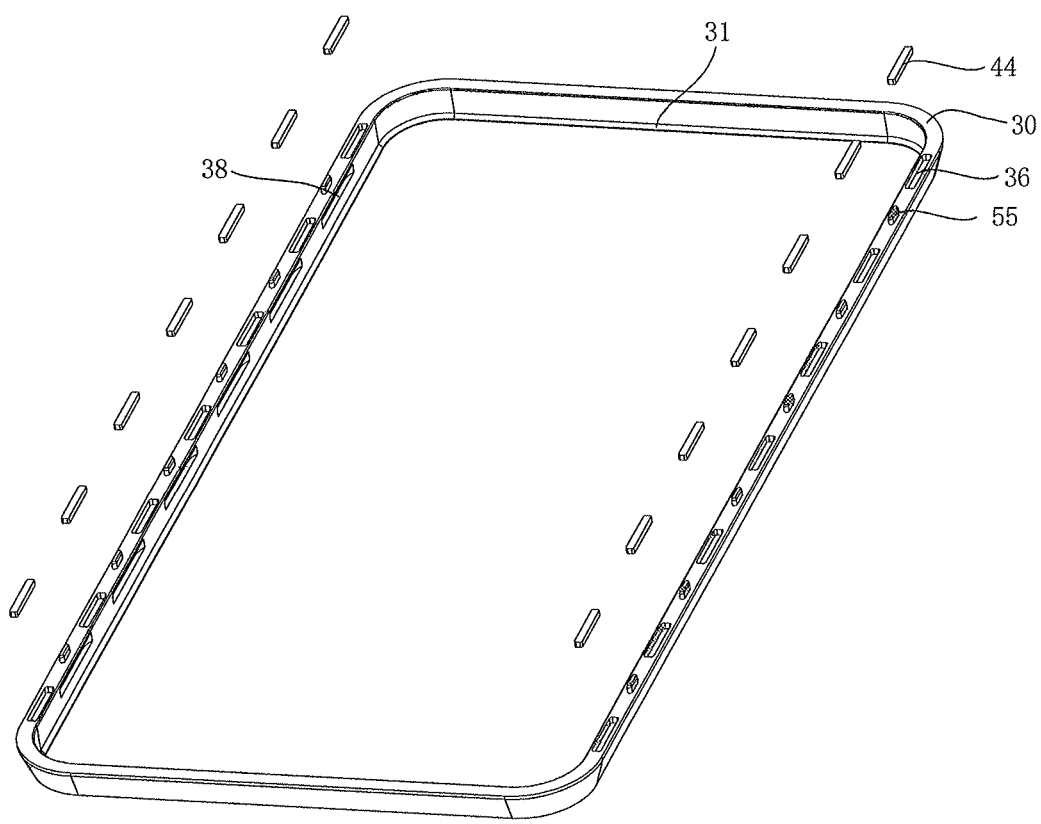
FIG. 13 is an exploded view of the screen protector with the drive assembly and locking mechanisms according to one embodiment of the present disclosure.
Figure 14:
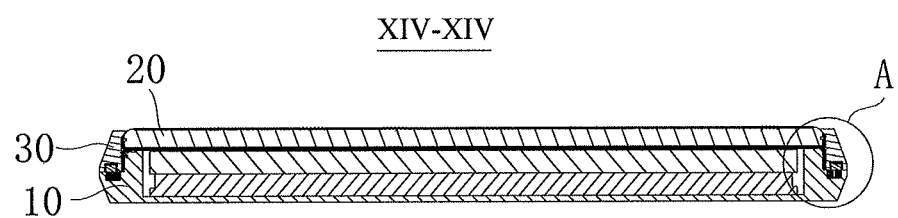
FIG. 14 is a cross-sectional view of the exemplary electronic device in FIG. 1 taken along a line XIV-XIV thereof.

Specifically, the drive assembly 40 may include at least one first magnetic component and at least one second magnetic component arranged opposite to the first magnetic component. In one embodiment, the first magnetic component may be an electromagnetic component 42. The second magnetic component may be a permanent magnet 44. Please also referring to FIGS. 11 to 13, in order to increase the strength of magnetic force, the drive assembly 40 of this embodiment may include a plurality of electromagnetic components 42 mounted on the housing 10 and a plurality of permanent magnets 44 mounted on the screen protector 30 and arranged opposite to the plurality of electromagnetic components 42. The plurality of electromagnetic components 42 and the plurality of permanent magnets 44 may have a one-on-one correspondence, as shown in FIGS. 14 and 15. The plurality of electromagnetic components 42 may be connected to each other through a wire. Furthermore, in order to improve stationeriness of motion of the screen protector 30 driven by the drive assembly 40, the plurality of electromagnetic components 42 may be arranged along a circumference of the housing 10 and spaced apart from each other.

Directions of magnetic fields generated by the plurality of electromagnetic components 42 may be changed by changing current direction, so as to drive the screen protector 30 to switch between the stretchable state and the retractable state. It should be noted that, when current is provided to the electromagnetic components 42, the electromagnetic components 42 may generate magnetic force. The screen protector 30 may be switched from the retractable state to the stretchable state by changing current direction to control the direction of the magnetic force generated by the electromagnetic components 42 to the permanent magnets 44.

It should be understood that when the electronic device is in a falling state, the current may be provided to the drive assembly 40, such that each electromagnetic component 42 generates repulsion to the corresponding permanent magnet 44. The permanent magnet 44 may move away from the corresponding electromagnetic component 42 under the repulsion, whereby the screen protector 30 with the permanent magnet 44 therein may move away from the housing 10 with the electromagnetic component 42 therein. Thus the screen protector 30 is stretched to be in the stretchable state.

After the electronic device falls onto the floor or stop falling for a certain time, i.e. the electronic device is in a non-falling state, current having reverse direction may be provided to the electromagnetic component 42, the repulsion to the permanent magnet 44 may be changed to the attraction to the permanent magnet 44. Under the attraction, the permanent magnet 44 may move towards the electromagnetic component 42, whereby the screen protector 30 with the permanent magnet 44 therein moves towards the housing 10 with the electromagnetic component 42 therein. Thus the screen protector 30 is retracted from the stretchable state to the retractable state.

The drive assembly 40 in this embodiment drives the screen protector 30 through the magnetic force between the electromagnetic components 42 and the permanent magnets 44, which could realize a simple structure and a reliable operation.

In another embodiment, the plurality of electromagnetic components 42 may be received in the screen protector 30, while the plurality of permanent magnets 44 may be received in the housing 10, which is not limited herein.

In this embodiment, each of the electromagnetic components 42 may be a magnetic coil, which is convenient for assembly and low in cost. Furthermore, magnetic force generated by the magnetic coil may be switched between repulsion and attraction by changing the direction of the current provided to the magnetic coil, which is convenient and reliable.

In one embodiment, the screen protector 30 may define a plurality of installing slots 36 (shown in FIG. 13) for accommodating the permanent magnets 44. Each of the installing slots 36 may have an opening at the bottom surface 34 of the screen protector 30 and towards the housing 10. The housing 10 may define a plurality of installing grooves 16 (shown in FIG. 12) for receiving the electromagnetic components 42. Each of the installing grooves 16 may have an opening at a surface of the housing 10, which contacting with the bottom surface 34 of the screen protector 30, and towards the screen protector 30. The openings of the installing slots 36 may correspond to those of the installing grooves 16, such that interaction strength between the electromagnetic components 42 and the corresponding permanent magnet 44 could be improved.

In one embodiment, as shown in FIG. 9, when the screen protector 30 includes a plurality of sub-protectors 301, each of the plurality of sub-protectors 301 may correspond to one electromagnetic component 42 and a corresponding permanent magnet 44.

Figure 16:
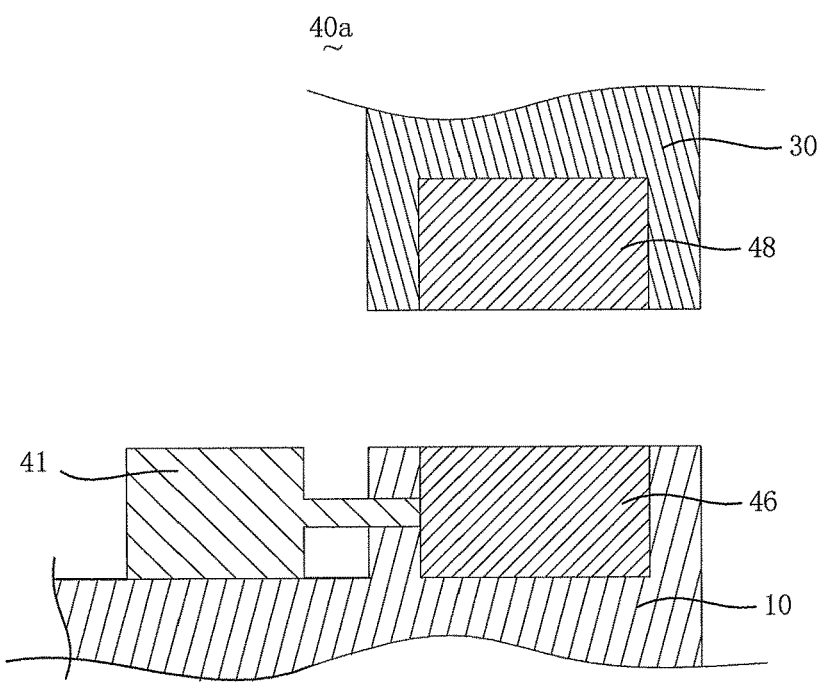
FIG. 16 is a schematic view of the drive assembly according to another embodiment of the present disclosure.

Referring to FIG. 16, in another embodiment, both the first magnetic component and the second magnetic component may be permanent magnets. The drive assembly 40a may include a plurality of first permanent magnets 46 mounted on the housing 10, a plurality of second permanent magnets 48 mounted on the screen protector 30 and arranged opposite to the plurality of first permanent magnets 46 and at least one motor 41 connected to the plurality of first permanent magnets 46. The at least one motor 41 is configured to drive the plurality of first permanent magnets 46 to rotate to change directions of magnetic fields generated by the plurality of first permanent magnets 46, so as to switch the screen protector 30 between the stretchable state and the retractable state.

The screen protector 30 may be buckled to the housing 10, which could simplify the structure of the electronic device, and make it more convenient to assemble the electronic device, thereby improving the assembly efficiency and reducing production cost.

Figure 17:
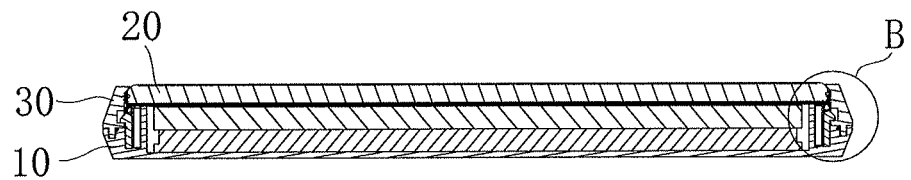
FIG. 17 is a cross-sectional view of the exemplary electronic device in FIG. 1 taken along a line XVII-XVII thereof.
Figure 18:
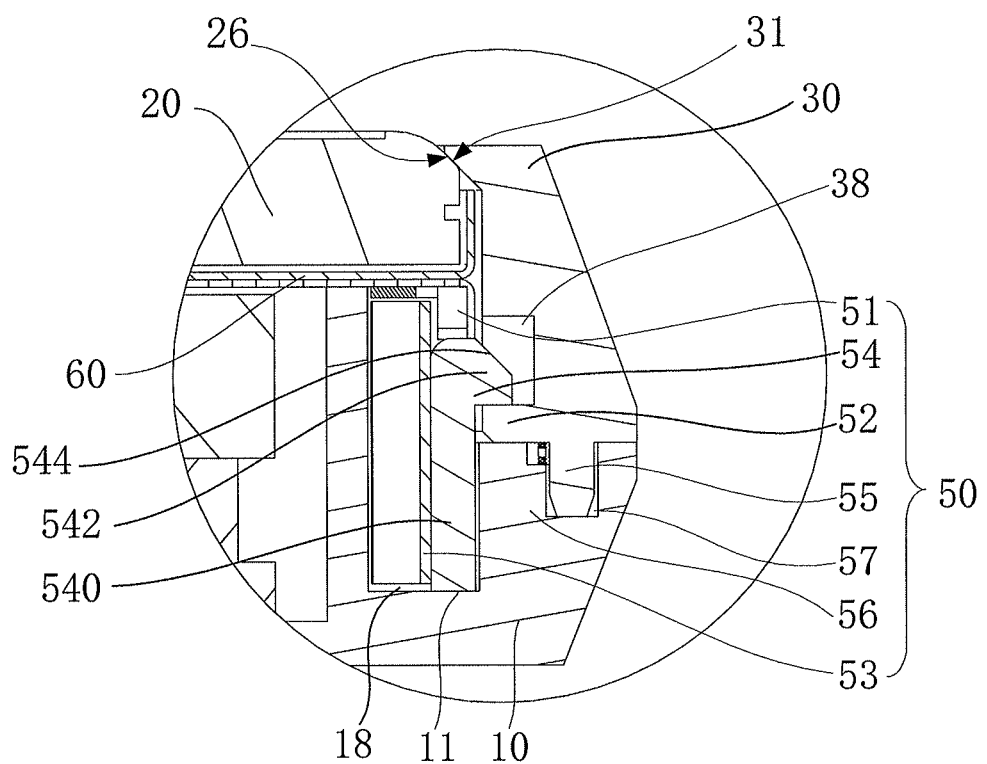
FIG. 18 is an enlarged view of circle B in FIG. 17.

Referring to FIGS. 17 and 18, in one embodiment, the screen protector 30 may be buckled with the housing 10 by a plurality of locking mechanisms 50 arranged between the screen protector 30 and the housing 10, such that the screen protector 30 could be attachable to and detachable from the housing 10, which may make it convenient for replacing the screen protector 30.

The plurality of locking mechanisms 50 may be arranged along a circumference of the screen protector 30 and spaced apart from each other, such that the screen protector 30 is buckled along the circumference thereof, which may improve the stability and firmness of the assembly of the screen protector 30 and the housing 10.

Specifically, the housing 10 may further define a plurality of grooves 18 along a circumference thereof, and have a bottom inner surface 11 in each of the grooves 18. The screen protector 30 may surround the screen 20 and further define a plurality of slots 38 arranged along a circumference thereof. The plurality of grooves 18 and the plurality of slots 38 may have a one-on-one correspondence. Each of the grooves 18 may be communicated with a corresponding slot 38.

In this embodiment, each of the locking mechanisms 50 may include a latching portion 52 arranged on the screen protector 30, a supporting portion 56 arranged on the housing 10 and a hook 54 configured to assemble the latching portion 52 and the supporting portion 56 together.

The hook 54, according to an exemplary embodiment, may include a main body 540 and a hook body 542 connected to the main body 540. The main body 540 may include an end connected to the hook body 542 and the other end opposite to the end. The main body 540 may be arranged in the groove 18 and be capable of moving in the groove 18. When the electronic device is in the non-falling state, the screen protector 30 is in the state, the other end of the main body 540 may contact with the bottom inner surface 11. When the electronic device is in the falling state, the screen protector 30 may stretch relative to the screen 20, the hook 54 may move with the stretching of the screen protector 30 and the other end of the main body 540 may be away from the bottom inner surface 11, such that the screen protector 30 and the locking mechanisms 50 could be integrated and simplify the structure of the electronic device. It should be noted that the hook 54 may be remained in the groove 18 no matter the screen protector 30 is in the stretchable state or in the retractable state.

The hook body 542 may be engaged in the corresponding slot 38 and match with the latching portion 52. The supporting portion 56 may be under the latching portion 52 and contact with the latching portion 52 such that the latching portion 52 is located and sandwiched between the hook body 542 and the supporting portion 56. Therefore, the screen protector 30 with the latching portion 52 and the housing 10 with the supporting portion 56 are assembled together.

In this embodiment, the hook body 542 engaged in the slot 36 may include a guiding inclined plane 544. The guiding inclined plane 544 could not only guide the assembly of the housing 10 and the screen protector 30, but also reduce friction between the hook 54 and the latching portion 52. The friction may be generated when the hook body 542 is being engaged into the slot 36.

The latching portion 52 and the screen protector 30 may be formed of a single piece. In another embodiment, the latching portion 52 may be an independent component connected to the screen protector 30 by welding or adhering.

The supporting portion 56 and the housing 10 may be formed of a single piece. In another embodiment, the supporting portion 56 may also be an independent component connected to the housing 10 by welding or adhering.

Figure 12:
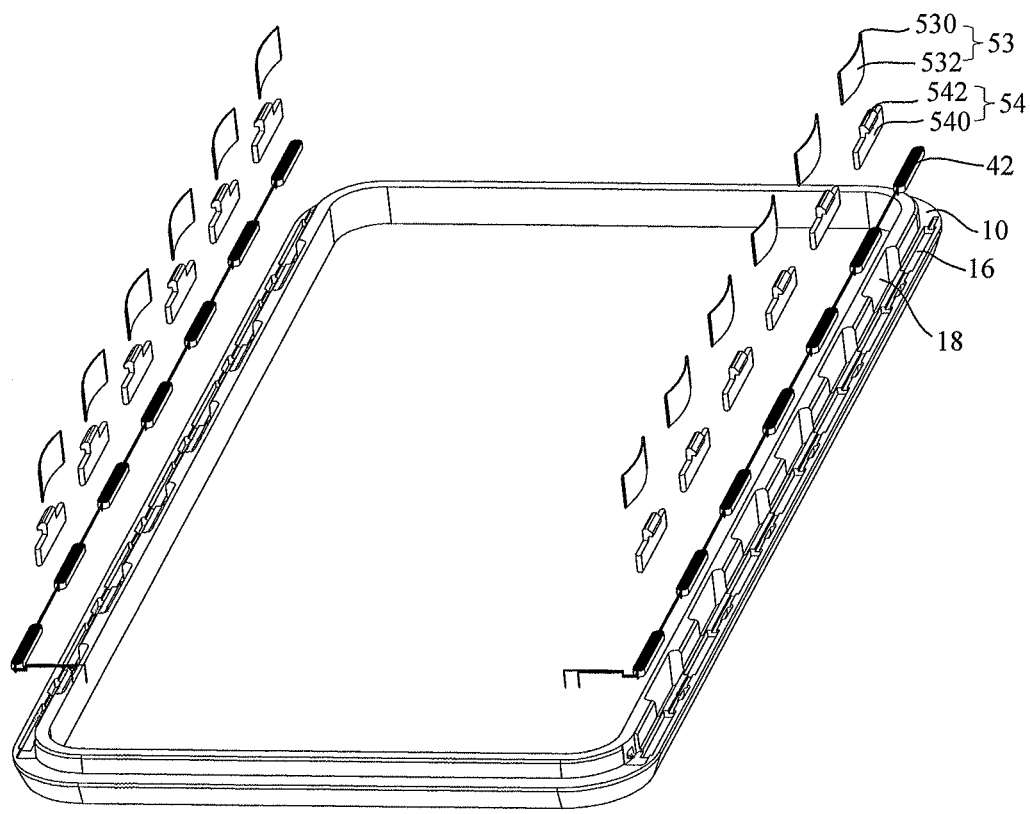
FIG. 12 is an exploded view of the housing with a drive assembly and locking mechanisms in FIG. 11.
Figure 19:
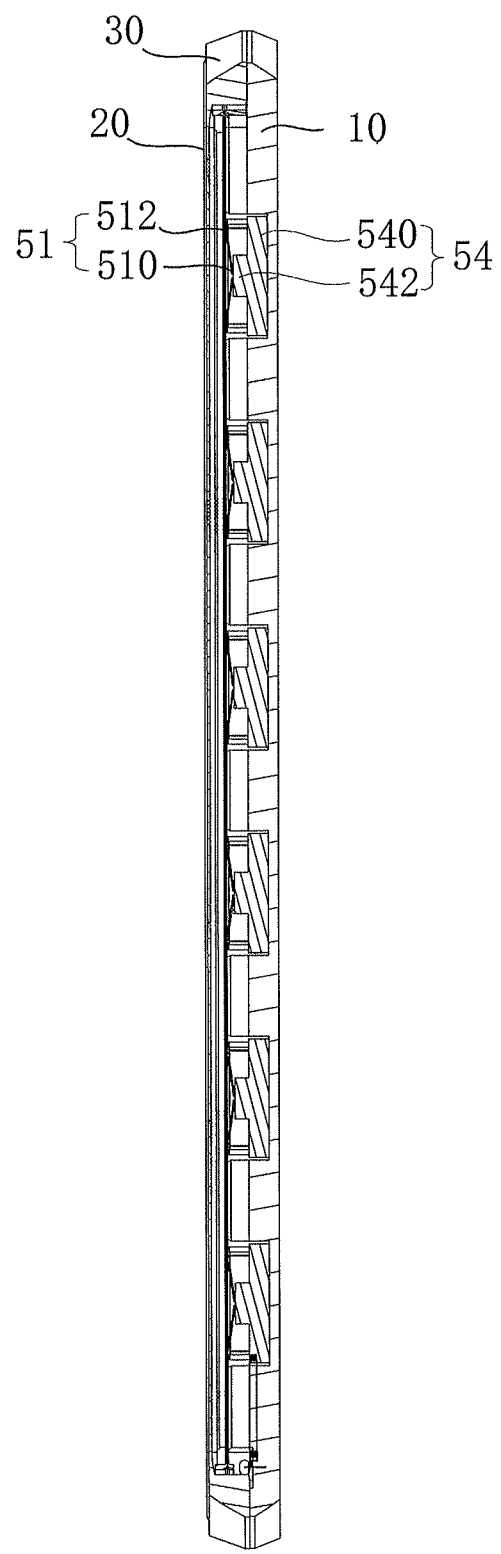
FIG. 19 is a cross-sectional view of the exemplary electronic device in FIG. 1 taken along a line XIX-XIX thereof.

Referring to FIG. 12 and FIGS. 18-19, in order to make the connection between the screen protector 30 and the housing 10 firmly, each of the locking mechanisms 50, according to an exemplary embodiment, may further include a first elastic element 51 capable of contacting with the hook body 542 and a second elastic element 53 received in the groove 18.

In this embodiment, the first elastic element 51 may have a lower end 510 abutting against the hook body 542 and an upper end 512 abutting against the bottom surface 22 of the screen 20. The first elastic element 51 may be configured to provide a down pressure force toward the hook 54 along a direction substantially perpendicular to the screen 20, so as to press the hook 54 towards the supporting portion 56 to sandwich the latching portion 52 firmly. When the electronic device is in the falling state, the screen protector 30 may move away from the housing 10, the hook 54 may move away from the bottom inner surface 11 with the screen protector 30, the first elastic element 51 may be compressed. When the electronic device is in the non-falling state, the screen protector 30 may be retracted from the stretchable state to the retractable state. The first elastic element 51 may provide elastic restoring force to help the hook 54 to move toward the bottom inner surface 11, which could facilitate the moving of the screen protector 30 toward the housing 10.

The first elastic element 51 may have a sheet configuration. In another embodiment, the first elastic element 51 may have a block configuration or other configurations. In still another embodiment, the first elastic element 51 may be a spring.

Also referring to FIG. 12 and FIG. 18, the second elastic element 53, according to an exemplary embodiment, may have a first end 530 fixed on the housing 10 and a second end 532 abutting against a surface of the main body 540 to press the main body 540 toward the supporting portion 56 along a direction substantially parallel to the screen 20. The second elastic element 53 of this embodiment may be an arched elastic tab, while in other embodiments, the second elastic element 53 may be a spring or have other configurations.

When the screen protector 30 is assembled to the housing 10, the latching portion 52 may contact with the hook body 542 firstly and press the hook 54 along a direction substantially parallel to the screen 20 and towards interior of the electronic device. Simultaneously, the second elastic element 53 may be compressed towards interior of the electronic device. After the screen protector 30 is assembled to an appropriate position, the second elastic element 53 may provide elastic restoring force to press the hook 54 towards the supporting portion 56, such that the hook body 542 could match with the latching portion 52 firmly, thereby improving the stability of the assembly between the screen protector 30 and the housing 10.

In one embodiment, it is the hook body 542 that abuts against the first elastic element 51. In another embodiment, it may be the main body 540 that abuts against the first element 51.

Figure 20:
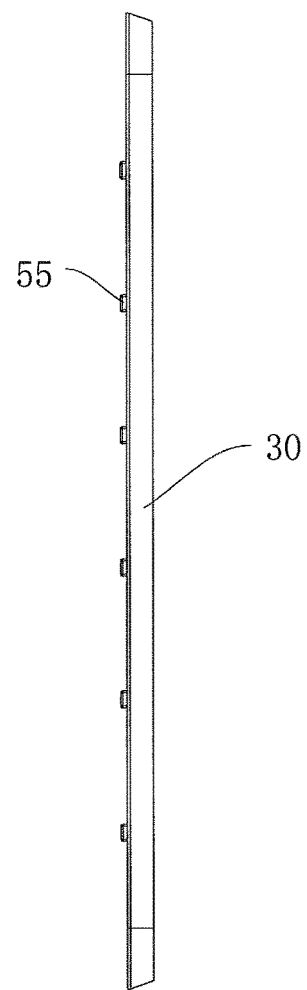
FIG. 20 is a side view of the screen protector according to one embodiment of the present disclosure.

Referring to FIG. 20 together with FIGS. 17 and 18, each of the locking mechanisms 50 of this embodiment may further include a positioning pin 55 arranged on the screen protector 30 and extending downwardly from an end of the latching portion 52. The supporting portion 56 may define a plurality of positioning slots 57. The positioning pin 55 may be engaged in a corresponding positioning slot 57. An extending direction of the positioning pin 55 may be substantially perpendicular to the screen 20. When the screen protector 30 is assembled to the housing 10, the positioning pin 55 may have a guiding function, which could facilitate the assembly between the screen protector 30 and the housing 10.

In this embodiment, a plurality of the positioning pins 55 may be arranged along a circumference of the screen protector 30, which may make the assembly between screen protector 30 and housing 10 more stable and convenient, thereby improving the assembly efficiency of screen protector 30.

It should be understood that, in another embodiment, the positioning pin 55 may be arranged on the supporting portion 56, and the plurality of positioning slots 57 may be defined by the screen protector 30.

Since the positioning pin 55 extends in the direction substantially perpendicular to the screen 20, the screen protector 30 may stretch and retract along the direction substantially perpendicular to the screen 20 under the guide of the positioning pin 55. When the electronic device is in the falling state, the screen protector 30 may move towards the direction away from the bottom surface 11 of the housing 10, and the hook 54 may be detachable from the bottom inner surface 11 of the housing 10 and press the first elastic element 51 towards the screen 20. When the electronic device is in the non-falling state, the screen protector 30 may move towards the bottom surface 11 of the housing 10, and the elastic restoring force provided by the first elastic element 51 may press the hook 54 toward the bottom surface 11 of the housing 10. Therefore, the integration of the screen protector 30 and the locking mechanisms 50 could be further improved.

Figure 21:
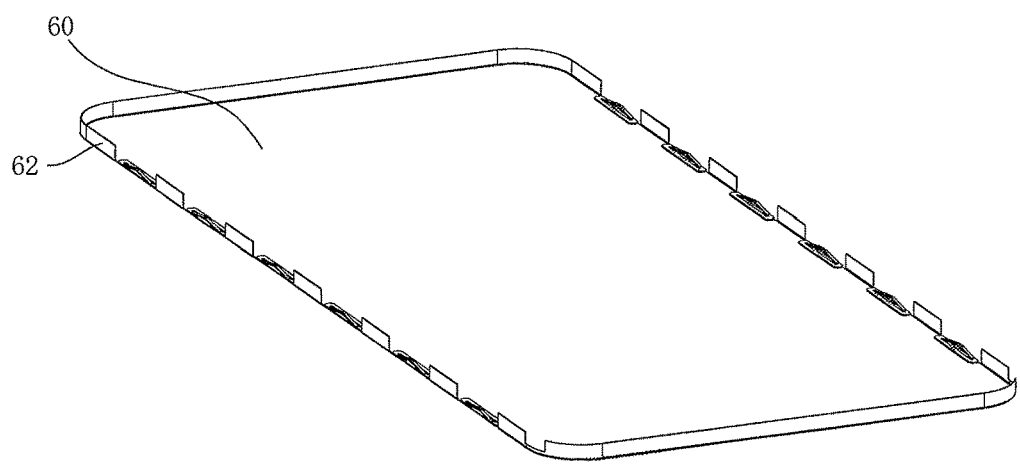
FIG. 21 is a perspective view of a sealing element of the exemplary electronic device according to one embodiment of the present disclosure.
Figure 22:
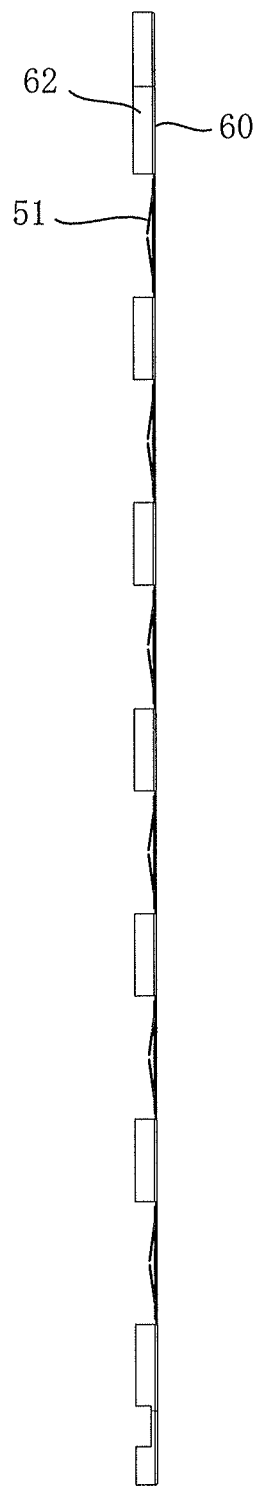
FIG. 22 is a side view of the sealing element of FIG. 21.

Referring to FIGS. 21 and 22, the sealing element 60, according to an exemplary embodiment, may be arranged between the screen protector 30 and the main board 70 (shown in FIG. 2). The sealing element 60 may be adhered to the screen 20 by glue. The sealing element 60 may be bent from a circumference and extend along a direction substantially perpendicular to the screen 20 to form a bending portion 62, which could seal the gap between the screen 20 and the housing 10. The sealing element 60 could seal the electronic device to prevent dust or liquid from entering into the electronic device to affect the performance of the electronic device and damage the electronic device. In addition, the first elastic element 51 of this embodiment may be arranged on the sealing element 60.

Figure 23:
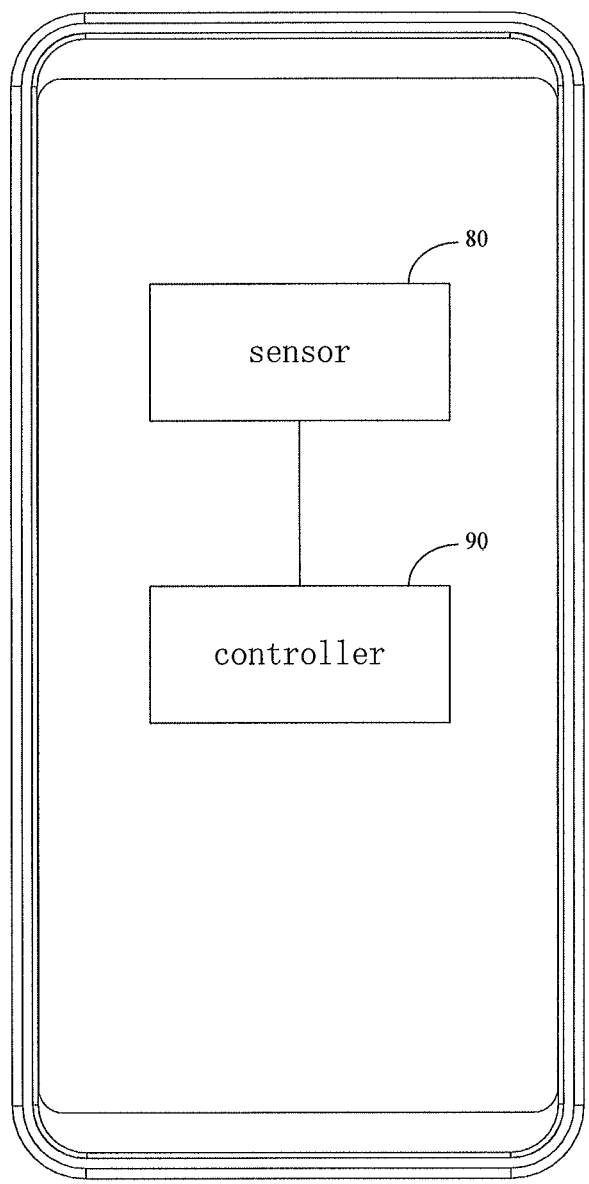
FIG. 23 is a schematic view of connection relationship between a sensor and a controller of the exemplary electronic device according to one embodiment of the present disclosure.
Figure 24:
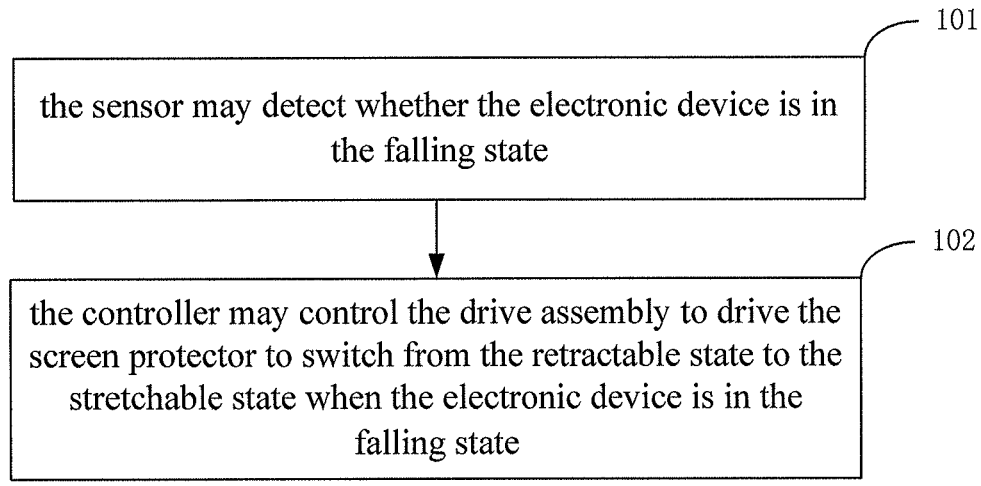
FIG. 24 is a flow chart of a method for protecting a screen of the electronic device according to one embodiment of the present disclosure.
Figure 25:
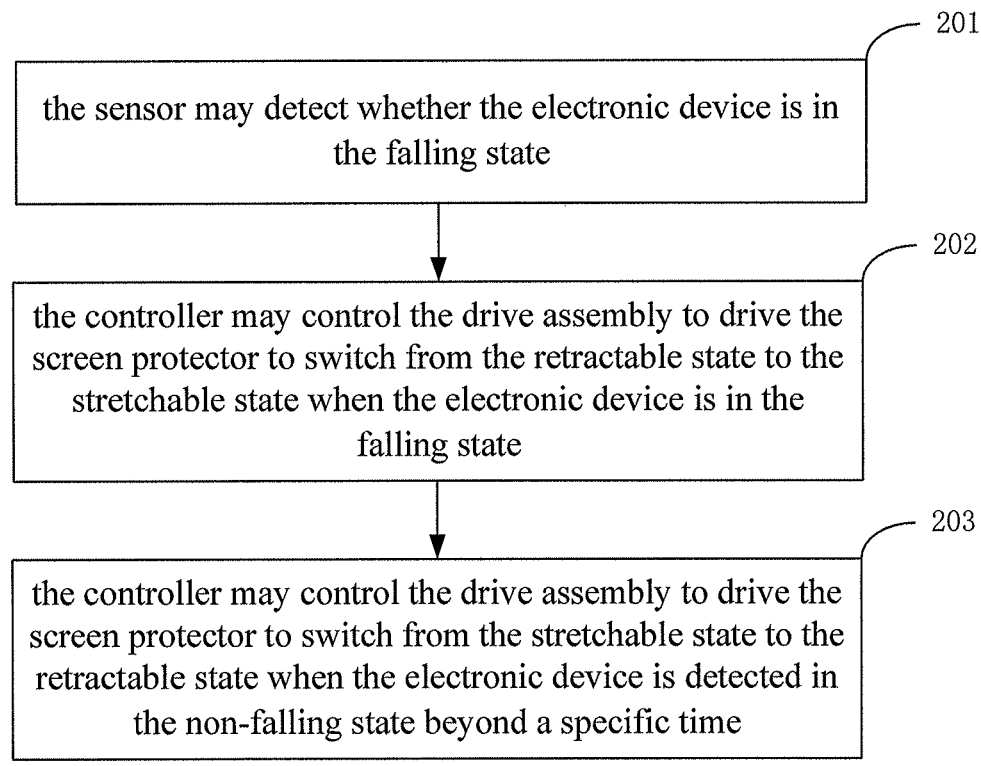
FIG. 25 is a flow chart of a method for protecting a screen of the electronic device according to another embodiment of the present disclosure.

Referring to FIG. 23, in this embodiment, the electronic device may further include at least one sensor 80 and a controller 90 embedded in the main board 70. The controller 90 may be received in the housing 10 and electrically connected with the at least one sensor 80 and the drive assembly 40. The at least one sensor 80 may be configured to detect whether the electronic device is getting close toward the object at a speed greater than a preset value. In this embodiment, the at least one sensor 80 may be configured to detect whether the electronic device is in the falling state. The controller 80 may be configured to control the drive assembly 40 to drive the screen protector 30 to move between the stretchable state and the retractable state in response to an output of the sensor. For example, the controller 80 of this embodiment may be configured drive the screen protector 30 to move from the retractable state to the stretchable state when the electronic device is in the falling state, or from the stretchable state to the retractable state when the electronic device is in the non-falling state.

In this embodiment, the at least one sensor 80 may include at least one of gyroscope, accelerometer, gravity sensor, inertial sensor, camera, height sensor and motion sensor. In order to improve the accuracy and timeliness of detecting the falling state of the electronic device, a plurality of sensors 80 could be arranged in the electronic device. The sensors 80 could be selected according to actual requirement. For example, the electronic device may include a gyroscope and a gravity sensor, which could detect the state of the electronic device more sensitively and accurately.

For example, when the electronic device is in the falling state, the sensor 80 may detect the state of the electronic device, and transmit the related information to the controller 90. After receiving the information, the controller 90 may control the drive assembly 40 to drive the screen protector 30 from the retractable state to the stretchable state to protect the screen 20, which could make the screen protector 30 protect the screen 20 more flexibly and reliably.

In other embodiments, the controller 90 may control the drive assembly 40 to run at a regular time, so as to drive the screen protector 30 to switch from the retractable state to the stretchable state at the regular time, such that the electronic device could realize a massage function and a vibration function.

The following is an introducing of operating mechanism of the screen protector 30 combining with the drive assembly 40 and the locking mechanisms 50.

When the electronic device is in the non-falling state, the screen protector 30 may be in the retractable state, and there may be no current provided to the electromagnetic components 42. At this time, the first elastic element 51 may be in a compressed state and provide elastic restoring force to the hook 54 such that the hook 54 is pressed toward the bottom inner surface 18 of the housing 10, thereby keeping the screen protector 30 connecting with the housing 10 and keeping the screen protector 30 in the retractable state.

When the sensor 80 detects that the electronic device is in the falling state, the sensor 80 may transmit the related information to the controller 80. The controller 80 may provide current to the electromagnetic components 42. Then the electromagnetic components 42 may generate repulsion to the permanent magnet 44. Under the repulsion and the guide of the positioning pin 55, the permanent magnet 44 may move along the direction substantially perpendicular to the screen 20 and away from the electromagnetic components 42, which may make the screen protector 30 move along the direction substantially perpendicular to the screen 20 and away from the housing 10, such that the screen protector 30 is stretched to the stretchable state to touch the floor 200 and prevent the screen 20 from touching the floor 200. As a result, impact energy is redirected from the screen 20 to the screen protector 30, thereby protecting the screen 20 effectively. At this time, the hook 54 may move with the moving of the screen protector 30, detachable from the bottom inner surface 11 and further compress the first elastic element 51.

When the sensor 80 detects that the electronic device is in the non-falling state, that is, the electronic device stops falling, the sensor 80 may transmit the related information to the controller 90. Then the controller 90 may provide current having the reverse direction to the electromagnetic components 42. Then the electromagnetic components 42 may generate attraction to the permanent magnet 44. Under the attraction and the guide of the positioning pin 55, the permanent magnet 44 may move along the direction substantially perpendicular to the screen 20 and towards the electromagnetic components 42, which may make the screen protector 30 move along the direction substantially perpendicular to the screen 20 and towards the housing 10, such that the screen protector 30 is retracted to the retractable state. At the same time, the first elastic element 51 may provide elastic restoring force to press the hook 54 towards the bottom inner surface 11 of the housing 10, so as to help the screen protector 30 returns to the retractable state.

In another embodiment, a rib (not shown) may be provided on one of the screen protector 30 and the housing 10, while the other one of the screen protector 30 and the housing 10 may define an embedding slot (not shown) matching with the rib. The matching between the rib and the embedding slot may improve the fastness of the assembly between the screen protector 30 and the housing 10, thereby preventing making noise between the screen protector 30 and the housing 10.

In another embodiment, a protect film (not shown) may be provided between the screen protector 30 and the housing 10, the protect film may be adhered on the surface of the housing facing the screen protector 30. In this way, the protect film could, on one hand, protect the electromagnetic components 42 embedded in the housing 10, on the other hand, improve the integrity of the housing 10.

In another embodiment, an elastic protector (not shown) may be arranged between the screen protector 30 and the housing 10. An end of the elastic protector may be detachable to the screen protector 30, the other end of the elastic protector may be detachable to the housing 10. When the screen protector 30 is in the retractable state, the elastic protector may also in a retractable state. When the screen protector 30 is in stretchable state, the elastic protector may pop out and form a cambered surface in the gap between the screen protector 30 and the housing 10, which could improve the integrity of the electronic device.

In still another embodiment, there may be an elastic sealing element (not shown) arranged between the screen protector 30 and the housing 10. When the screen protector 30 is in stretchable state, the elastic sealing element may seal the gap between the screen protector 30 and the housing 10 so as to prevent external impurities or liquid from entering into the electronic device to damage the electronic device, which could improve the sealing of the electronic device.

In addition, foam may be provided between the screen protector 30 and the housing 10. When the electronic device drops, the foam may slow down the impact of the floor, whereby the foam may further protect the screen 20.

The present disclosure further provides a method for protecting a screen of an electronic device. In this embodiment, the electronic device may include the shell 10, the screen 20 embedded in the shell 10, the screen protector 30 connected to the shell 10 and arranged at a circumference of the screen 20, the drive assembly 40, the sensor 80 and the controller 90 connected to the shell 10 and electrically connected with the sensor 80.

Specifically, the screen protector 30 may be configured to stretch or retract relative to the screen 20 such that the screen protector 30 is in the stretchable state or in the retractable state. When the screen 20 is falling down toward an object, the screen protector 30 may be configured to stretch relative to the screen 20 and be in the stretchable state such that the screen protector 30 touches the object to prevent the screen 20 from touching the object. When the screen 20 is in a non-falling state, the screen protector 30 may be in the retractable state. The drive assembly 40 may be configured to drive the screen protector 30 to switch between the stretchable state and the retractable state by magnetic force. The sensor 80 may be configured to detect whether the electronic device is in a falling state. The controller 90 may be configured to control the drive assembly 40 to drive the screen protector 30 to switch between the stretchable state and the retractable state. The shell 10, the screen 20, the screen protector 30, the drive assembly 40, the sensor 80, the controller 90 and the operating mechanism thereof may be those described previously, which will not be described in detail.

The method of this embodiment may include the following blocks.

At block 101, the sensor may detect whether the electronic device is in the falling state.

At block 102, the controller may control the drive assembly to drive the screen protector to switch from the retractable state to the stretchable state when the electronic device is in the falling state.

In another embodiment, the method may include the following blocks.

At block 201, the sensor may detect whether the electronic device is in the falling state.

At block 202, the controller may control the drive assembly to drive the screen protector to switch from the retractable state to the stretchable state when the electronic device is in the falling state.

At block 203, the controller may control the drive assembly to drive the screen protector to switch from the stretchable state to the retractable state when the electronic device is detected in the non-falling state beyond a specific time.

Specifically, the specific time may be 5 seconds, 10 seconds or 30 seconds. The electronic device is detected in the non-falling state beyond the specific time may mean that the electronic device may not fall and may be safe, at this time, the screen protector 30 could retract to the retractable state.

Taking the electronic device as a mobile phone for an example, in one embodiment, the mobile phone may include the housing 10, the screen 20 and the screen protector 30 as previously described. The mobile phone may further include a RF circuit, a memory, an input unit, a Wi-Fi module, display assembly, sensors, audio circuits, a processor, a fingerprint assembly and a power supply, which are not illustrated with numbers in drawings.

The RF circuit may be configured to receive and transmit information. In special, the RF circuit sends downlink information to the processor after receiving the downlink information from a base station, and transmits uplink data to the base station. Usually, the RF circuit includes, but is not limited to, an antenna, at least one amplifier, a transceiver, a coupler, a Low Noise Amplifier (LNA), a duplexer and so on. In addition, the RF circuit may further communicate with other devices via wireless communication and a network. The wireless communication may use any one communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS) and so on.

The memory may be configured to store software programs and modules, and the processor executes various function applications and data processing of the mobile phone by running the software programs and the modules stored in the memory. The memory may mainly include a program storage region and a data storage region, the storage program region may store an operation system, application programs for at least one function (a power manager service (PMS) wake-up function, a fingerprint data acquisition function, a feature point matching function, and a display lighting function) and so on; and the data storage region may store data (such as fingerprint data obtained by a fingerprint recognition sensor, pre-stored preset quick unlocking period, statistical information of screen-off unlocking period and so on) created according to use of the mobile phone. In addition, the memory may include a high-speed RAM, and may further include a non-volatile memory such as one of at least a disk storage device, a flash device, or other non-volatile solid storage devices.

The input unit may be configured to receive input digital or character information and generate key signal input associated with user setting and functional control of the mobile phone. Specifically, the input unit may include a touch panel and other input devices. The touch panel is also named as touch screen, which is configured to collect touch operations thereon or there-near (such as operations by users' fingers, a touch pen and the like), and drive corresponding connection devices according to preset programs. Optionally, the touch panel may include two parts: a touch detection apparatus and a touch controller. The touch detection apparatus detects a touch operation by a user, converts the detected touch operation into an electrical signal, and transmits the electrical signal to the touch controller. The touch controller receives the electrical signal from the touch detection apparatus, converts the electrical signal into coordinates of a touch point, and then sends the coordinates to the processor. The touch controller may also receive and execute a command sent by the processor. In addition, the touch panel may be a resistive, capacitive, infrared (Infrared), or surface acoustic wave touch panel. The other input devices may include, but are not limited to, one or more of a physical keyboard, a functional key (such as a volume control key and a switch key), a track ball, a mouse, and an operating rod.

The touch panel can cover the display panel 220, when the touch operation on or near the touch panel is detected, the touch panel will transmit the touch operation to the processor to determine the type of touch event; thereafter, the processor can provide a corresponding visual output on the display panel according to the type of the touch event.

The display assembly may include a display panel including Liquid Crystal Display (LCD), an Organic Light-Emitting Diode (OLED) and the like. In addition, the touch panel may cover the display panel, and when the touch panel detects the touch operation on or near it, the touch panel may transmit corresponding information to the processor to determine the type of touch event. Then the processor provides the corresponding visual output on the display panel based on the type of touch event.

The fingerprint assembly may recognize the user's fingerprint information and transmit the information to a control assembly (for example, a processor) of the electronic device when the user's fingerprint approaches the fingerprint assembly. The control assembly may send a corresponding instruction based on the fingerprint information. The fingerprint is unique and cannot change for the lifetime, thereby improving the privacy of the electronic device due to the provision of the fingerprint assembly.

The audio circuits, speakers, and microphones can provide an audio interface between the user and the phone. The audio circuit can convert the audio data received into electronic signals, and transmit the electronic signals to the speaker, whereby the speaker can convert the electronic signals to sound signals for output. Moreover, a microphone can convert the sound signal received to electronic signals which will be converted into audio data after reception by the audio circuit. The audio circuit output the audio data to the processor, after processing, the processor can transmit the audio data to another mobile phone via the RF circuit, or, the processor can output the audio data to the memory for further process.

Wi-Fi belongs to a short-range wireless transmission technology, the mobile phone may assist the user in E-mail receiving and sending, webpage browsing, access to streaming media and the like by means of the Wi-Fi module, and it provides a wireless wideband internet access for the user. However, it may be understood that the Wi-Fi module can be optional components of the mobile phone and can totally be omitted without changing the essence of the present disclosure as required.

The processor is a control center of the mobile phone, and it is configured to connect all parts of the mobile phone by utilizing various interfaces and lines, to run or execute the software program and/or the module stored in the memory and call data stored in the memory to execute various functions and processing data of the mobile phone, so as to wholly monitor the mobile phone. Alternatively, the processor may include one or more processing units. The processor may be integrated with an application processor and a modulation-demodulation processor, the application processor mainly processes an operation system, a user interface, an application program and the like, and the modulation-demodulation processor mainly processes wireless communication. It should be understood that the modulation-demodulation processor may not be integrated into the processor.

The power supply (such as a battery) for supplying power to each component. The power supply may be connected with the processor logically via a power supply management system, so as to implement functions of charging, discharging, and power consumption management by means of the power supply management system. The mobile phone may further include a camera, a Bluetooth module and the like, which are not illustrated, and will not be elaborated herein.

It could be understood that, one skilled in the art may make any equivalence or modification based on the technical solution and the inventive concept of the present disclosure. All these modifications and equivalences shall all be covered within the protection claimed in the claims of the present disclosure.

What is claimed is:

1. An electronic device, comprising:
    a housing defining a plurality of positioning slots;
    at least one screen, received in the housing;
    at least one screen protector connected to the housing and configured to stretch or retract relative to the at least one screen such that the at least one screen protector moves between a stretchable state and a retractable state, wherein when the at least one screen is getting close toward an object at a speed greater than a preset value, the at least one screen protector stretches relative to the at least one screen along a direction perpendicular to the at least one screen to be in the stretchable state, such that the at least one screen protector touches the object to protect the at least one screen from touching the object, wherein a plurality of positioning pins are arranged on the screen protector, each of the plurality of positioning pins has an extending direction perpendicular to the screen and is engaged in a corresponding positioning slot, the screen protector stretches and retracts along a direction perpendicular to the screen under the guide of the plurality of positioning pins; and
    a drive assembly, comprising a first magnetic component and a second magnetic component arranged opposite to the first magnetic component, wherein the first magnetic component is received in the housing, the second magnetic component is received in the at least one screen protector, the drive assembly is configured to drive the at least one screen protector to move between the stretchable state and the retractable state by magnetic force between the first magnetic component and the second magnetic component.

2. The electronic device of claim 1, wherein the at least one screen is flat and comprises a top surface; the at least one screen protector comprises a top surface and a bottom surface opposite to the top surface along a direction substantially perpendicular to the at least one screen, the top surface of the at least one screen protector is farther from a bottom surface of the housing than the bottom surface of the at least one screen protector; when the at least one screen protector is in the retractable state, a first distance from the top surface of the at least one screen protector to the bottom surface of the housing is less than or equal to a second distance from the top surface of the at least one screen to the bottom surface of the housing; when the at least one screen protector is in the stretchable state, the first distance is greater than the second distance.

3. The electronic device of claim 2, further comprising a plurality of locking mechanisms between the at least one screen protector and the housing to buckle the at least one screen protector with the housing.

4. The electronic device of claim 3, wherein the housing defines a plurality of grooves along a circumference thereof, the at least one screen protector surrounds the at least one screen and defines a plurality of slots arranged along a circumference thereof, the plurality of grooves and the plurality of slots have a one-on-one correspondence, each of the grooves is communicated with a corresponding slot, the housing has a bottom inner surface in the groove;
    each of the locking mechanisms comprises:
    a latching portion arranged on the at least one of the screen protector;
    a hook comprising a main body arranged in the groove and contacting with the bottom inner surface and a hook body engaged in the corresponding slot and matching with the latching portion; and
    a supporting portion arranged on the housing and in contact with the latching portion such that the latching portion is located between the hook body and the supporting portion.

5. The electronic device of claim 4, wherein each of the locking mechanisms further comprises a first elastic element and a second elastic element which are received in the groove; wherein
    the first elastic element has a first end abutting against the hook body and a second end abutting against a bottom surface of the at least one screen, the first elastic element is configured to provide a pressure force toward the hook along a direction substantially perpendicular to the at least one screen; and the second elastic element has a first end fixed on the housing and a second end abutting against a surface of the main body to press the main body toward the supporting portion along a direction substantially parallel to the at least one screen.

6. The electronic device of claim 5, wherein when the at least one screen protector is in the stretchable state, the at least one screen protector moves toward a direction away from the bottom surface of the housing with the hook detachable from the bottom inner surface of the housing, the hook presses the first elastic element toward the at least one screen.

7. The electronic device of claim 1, wherein the first magnetic component comprises a plurality of electromagnetic components received in the housing, the plurality of electromagnetic components are arranged along a circumference of the housing and spaced apart from each other;

the second magnetic component comprises a plurality of permanent magnets provided on the at least one screen protector, the plurality of permanent magnets and the plurality of electromagnetic components have a one-on-one correspondence.

8. The electronic device of claim 1, further comprising:
at least one sensor, configured to detect whether the electronic device is getting close toward the object at the speed greater than the preset value; and
a controller, configured to control the drive assembly to drive the at least one screen protector to move from the retractable state to the stretchable state when the electronic device is getting close toward the object at the speed greater than the preset value, or from the stretchable state to the retractable state when the electronic device is getting close toward the object at a speed less than the preset value.

9. The electronic device of claim 8, wherein the at least one sensor comprises at least one of gyroscope, accelerometer, gravity sensor, inertial sensor, camera, height sensor and motion sensor.

10. The electronic device of claim 1, further comprising a sealing element arranged between the at least one screen protector and the housing.

11. The electronic device of claim 1, wherein each of the at least one screen protector is arranged along a circumference of the at least one screen.

12. The electronic device of claim 1, wherein the first magnetic component is a magnetic coil.

13. An electronic device, comprising:
a shell, defining a plurality of positioning slots;
a screen mounted in the shell;
a screen protector presented as a frame being made in one piece, connected to the shell, arranged at a periphery of the screen and surrounding the screen, an inner surface of the screen protector contacts with an outer side surface of the screen, the screen protector is configured to stretch or retract relative to the screen such that the screen protector moves between a stretchable state and a retractable state, wherein a plurality of positioning pins are arranged on the screen protector, each of the plurality of positioning pins has an extending direction perpendicular to the screen and is engaged in a corresponding positioning slot, the screen protector stretches and retracts along a direction perpendicular to the screen under the guide of the plurality of positioning pins; and a controller, received in the housing and electrically connected with a sensor, the controller is configured to control the screen protector to stretch relative to the screen along a direction substantially perpendicular to the screen to be in the stretchable in response to an output of the sensor, such that the screen protector protrudes relative to the screen to protect the screen.

14. The electronic device of claim 13, wherein when the screen protector is in the retractable state, the screen protector is leveled with or below the screen, when the screen protector is in the stretchable state, the screen protector is above the screen.

15. The electronic device of claim 13, wherein the screen protector has a shape of rectangular or long round.

16. The electronic device of claim 13, wherein the screen protector is stretched or retracted relative to the shell by magnetic force.

17. The electronic device of claim 16, further comprising:
a plurality of electromagnetic components, mounted on the housing, and
a plurality of permanent magnets, mounted on the screen protector and arranged opposite to the plurality of electromagnetic components;
wherein the plurality of electromagnetic components are capable of changing directions of magnetic fields generated by the plurality of electromagnetic components, so as to drive the screen protector to move between the stretchable state and the retractable state.

18. The electronic device of claim 16, further comprising:
a plurality of first permanent magnets mounted on the housing;
a plurality of second permanent magnets mounted on the screen protector and arranged opposite to the plurality of first permanent magnets; and
at least one motor connected to the plurality of first permanent magnets, wherein the at least one motor is configured to drive the plurality of first permanent magnets to rotate to change directions of magnetic fields generated by the plurality of first permanent magnets, so as to switch the screen protector between the stretchable state and the retractable state.

19. An electronic device, comprising:
a shell, defining a plurality of positioning slots;
a screen mounted in the shell;
a screen protector connected to the shell and configured to stretch or retract relative to the screen such that the screen protector moves between a stretchable state and a retractable state, wherein when the screen protector is in the retractable state, the screen protector is leveled with or below the screen, and when the screen protector is in the stretchable state, the screen protector is above the screen, wherein a plurality of positioning pins are arranged on the screen protector, each of the plurality of positioning pins has an extending direction perpendicular to the screen and is engaged in a corresponding positioning slot, the screen protector stretches and retracts along a direction perpendicular to the screen under the guide of the plurality of positioning pins;
a drive assembly, comprising a first magnetic component and a second magnetic component arranged opposite to the first magnetic component, wherein the first magnetic component is received in the housing, the second magnetic component is received in the screen protector, the drive assembly is configured to drive the screen protector to move between the stretchable state and the retractable state by magnetic force; and a controller, received in the shell and electrically connected with a sensor, the controller is configured to control the drive assembly to drive the screen protector to move between the stretchable state and the retractable state in response to an output of the sensor.

* * * * *